ELECTRONIC MODULAR UNITS

Filed April 12, 1955

RAY R. SCOVILLE
INVENTOR.

BY Nicholas T Vohr
ATTORNEY

Nov. 17, 1959

R. R. SCOVILLE 2,913,634

ELECTRONIC MODULAR UNITS

Filed April 12, 1955

3 Sheets-Sheet 2

INVENTOR.
RAY R. SCOVILLE

BY Nicholas T Volk

ATTORNEY

Nov. 17, 1959 R. R. SCOVILLE 2,913,634

ELECTRONIC MODULAR UNITS

Filed April 12, 1955 3 Sheets-Sheet 3

RAY R. SCOVILLE
INVENTOR.

BY Nicholas T. Volk

ATTORNEY

United States Patent Office 2,913,634

Patented Nov. 17, 1959

2,913,634

ELECTRONIC MODULAR UNITS

Ray R. Scoville, La Canada, Calif.

Application April 12, 1955, Serial No. 500,850

17 Claims. (Cl. 317—101)

This invention relates to electronic modular units and more particularly to the units utilizing a plurality of insulation strips integrated into self-contained modular units provided with a plurality of bifurcated terminals for receiving electronic circuit components and thermionic tubes, and also provided with riser wires for plugging the entire unit into a terminal board having a plurality of terminals for receiving the riser wires.

Modular electronic units are now an accepted structural, or layout, standard in a larger part of electronic industry. Such units include printed circuits, printed circuit assemblies and a large number of integrated, self-contained electronic structures including a plurality of vertical and horizontal panels with electronic components mounted in a variety of ways on or between the panels. Modular units in electronic assemblies in many instances must be mechanically self-contained units, including thermionic tubes, tube sockets, means for mounting circuit components, multiple prong plugs for connecting these units to larger units or external circuits or power supplies. Printed circuits, as a rule, represent an effective solution of many electronic packaging problems when a large production of identical units is contemplated and the expense of producing such circuit packaging can be distributed over this large production of the same units to justify relatively high initial cost. However, when only a moderate production or only individual special units are contemplated, the initial high cost of the printed circuits cannot be distributed over many units and it then becomes more advantageous or cheaper to consider structures which are less expensive and at the same time have advantages of their own, such as simplicity of wiring and effective utilization of space in three dimensions with greater ease than this is possible with the printed circuits.

The diclosed modular units utilize a plurality of pre-punched insulation strips which are rigidly supported by riser wires in parallel planes. The spacings between the strips can be adjusted by sliding the strips up or down along the riser wires. The strips have a plurality of bifurcated terminals arranged along the edges of the strips for mounting electronic components across the strips and some components between the strips. When the strips are spaced closely to each other, then practically all components are mounted along the two flat surfaces of each strip rather than between the strips. The cross-connections are then made by means of riser wires and simple straps. The insulation strips are not limited to any particular size but may be made in a variety of sizes, but the size of the strips, as a rule, is the same in any given single assembly so as to form a compact modular unit. The riser wires generally continue beyond the plane of the last strip and terminate as extended pins which are used for plugging the entire modular unit into special, novel terminals devised for receiving these pins. The novel terminals are mounted on an insulation strip, similar to those used for constructing the modular units, with the result that the riser wires are also used for plugging the entire modular unit into a special socket whose terminals may be connected to an outgoing cable or any other component of a larger or smaller electronic assembly. The modular units are adapted to use standard radio tube sockets or the radio tube sockets may be eliminated altogether for the economy of space and convenience of wiring. In this case the tube prongs are plugged into special terminals, called forklets, which are mounted flush with one, outer surface of an outer insulation strip. The forklet terminal passes through an orifice in the strip and is provided with two spring-shaped side-springs which are also shaped for receiving wires for connecting the terminal or the forklet to other parts of a circuit or circuits.

The disclosed units possess high structural strength, excellent adaptability for dip-soldering and automatic assembly methods, simple and direct wiring, maximum compactness with highly efficient utilization of space in all three dimensions, and very low initial cost which makes these units especially suitable where no mass production printed circuit techniques can be contemplated because of high initial costs. It should be noted here, however, that the cost advantage is on the side of the disclosed units rather than on the side of the printed circuits, however large is the contemplated production. The "space utilization" of the disclosed units also is at least as good as that of the printed circuits, and in many instances is better than that of the printed circuits which are most efficient in a single plane, but do not offer any ready solution for the three-dimensional utilization of the allotted cubic displacement of any given modular unit, i.e. mounting of the components along the $x$, $y$ and $z$ axes of the three-dimensional coordinates.

It is, therefore, an object of this invention to provide novel modular electronic units utilizing a plurality of insulation strips held in spaced parallel planes by a plurality of riser wires and provided with a plurality of bifurcated terminals, or forked terminals, for ready mounting of the electronic circuit components in any plane defined by the three dimensional $x$, $y$ and $z$ coordinates, and thermionic tubes in one of these planes, with the riser wires being also capable of acting as a means for making electrical connections and also as plug-in prongs for plugging the units into forked terminals connected to other units or external circuits.

Still another object of this invention is to provide novel modular electronic unit assemblies which are completely self-contained and are capable of receiving and having means for mounting any type of electronic components in three dimensions which are equipped with special terminals for directly receiving thermionic or other type of tubes or amplifying devices, such as transistors, and which also have riser wires capable of acting as plug-in prongs.

It is also an object of this invention to provide novel means for integrating a plurality of insulation strips into an effective modular unit having novel terminals for receiving tubes, novel terminals for mounting circuit components along any one of the three dimensions, and also having means for plugging said unit into a receptacle for connecting such unit to other parts of an electronic system or circuits.

It is also an object of this invention to provide novel means for mounting multi-prong electronic tubes and other electronic devices, such as transistors.

Still another object of this inventon is to provide novel terminals capable of receiving a plurality of conductors lying in different planes.

The foregoing objects, advantages, and construction of the present invention will be more readily understood and seen from the following description and accompanying drawings in which.

Figure 1:
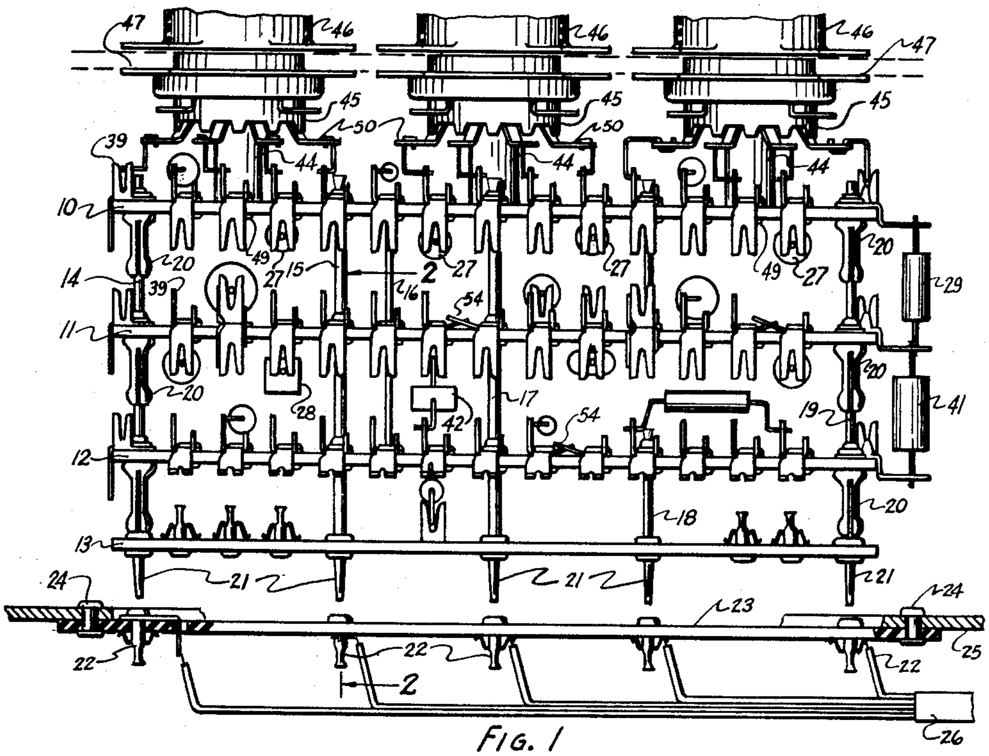
Figure 1 is a side elevational view of one type of a modular unit.
Figures 2, 3:
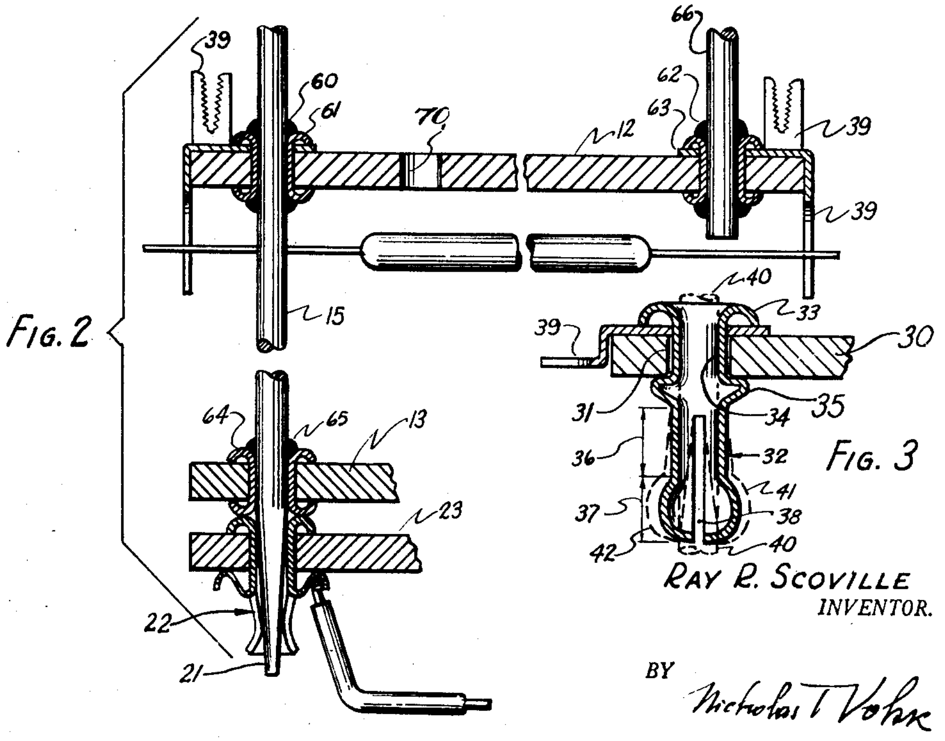
Figure 2 is an enlarged view, partly in section, of a riser wire structure and of a female terminal for receiving the riser wire, the view being taken along line 2—2 illustrated in Fig. 1.
Figure 3 is a vertical sectional view of a clip-type terminal for receiving and gripping a riser wire passing through such terminal.
Figure 10:
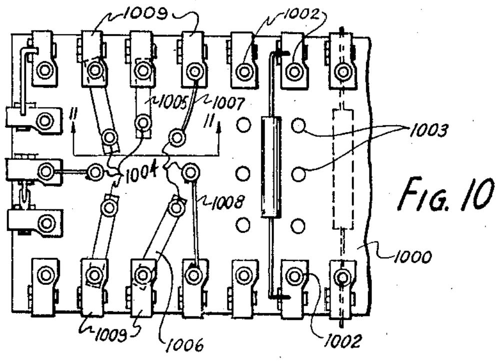
Figures 10 and 11 are plan and vertical sectional views, respectively, of novel means for mounting thermionic tubes or other amplifying devices having prongs for connecting them to outside circuits.

Referring to Figs. 1 and 2, the assembly illustrated in these figures is a deck-type electronic assembly including four insulation strips 10, 11, 12 and 13. The strips are rectangular in shape, as illustrated in Fig. 10, where a portion of one of the strips is illustrated in a plan view. The strips have a plurality of perforations, such as perforations 1002 and 1003, Fig. 10, the 1002 perforations being along the edges of the strip, while perforations 1003 are in the central portion of the strip. These perforations are not visible in Fig. 1, but one central perforation 70 is visible in Fig. 2. Suitable materials for the strips are phenolic plastics or glass silicone, both of which have high surface and specific resistances. While the assembly is illustrated with four insulation strips 10–13, a larger or smaller number of strips can be used, depending upon the nature of the assembly contemplated.

The strips are held in four, spaced, parallel planes by means of a plurality of riser wires 14, 15, 16, 17, 18 and 19, a lesser or a larger number of the riser wires being possible in any given assembly. It is generally advisable to have at least four riser wires located at the four corners of the strips, such as wires 14 and 19 (the remaining two wires would be directly in line with the wires 14 and 19 in this figure, and therefore, they are not visible in this figure), to obtain rigid and very strong integration of the individual strips into a single unitary structure. This integration is obtained as follows: Each corner orifice, or perforation, located at the corner of each strip, first receives a clip-type terminal, such as 20, which is illustrated on an enlarged scale in Fig. 3. Referring to Fig. 3, the corner portion of the strip is illustrated by a strip 30, and the corner perforation, or orifice, 31 receives the corner clip-type terminal, or the riser wire clip 32. Clip 32 includes an eyelet portion 33; a neck 34; an expanded portion 35; a tubular portion 36; a spherically shaped, expanded and then contracted end-portion 37; and one or two lateral slits 38, only one slit being visible in Fig. 3. The clip is inserted into orifice 31 from below, and then its protruding straight neck portion 34 is expanded into an eyelet 33. This fastens the clip to strip 30. A "zip" terminal 39 may be inserted under an eyelet 33. Terminal 39 will be described more fully in connection with the description of Figs. 10 and 11. A riser wire 40 is inserted into clip 32. Because of the constricted lower end 37, which is provided with two jaws 41 and 42, the riser wire expands the jaws in the manner indicated by dotted lines 41 and 42, and this lower end of the clip grips the wire and holds it in fixed position with respect to the clip. By exerting pressure on the riser wire or on strip 30, it can be slid up and down in the clip, and therefore the position of any given insulation strip 30 can be adjusted on the wire along its length. After the strips are spaced to any desired extent with respect to each other, permanent connection is made between the riser wires and the clips by dip-soldering the entire unit. This dip-soldering is done at the completion of the entire wiring operation of the unit so that all electronic circuit components become connected to their respective terminals during this dip-soldering.

Referring again to Fig. 1, the lower ends 21 of the riser wires, which project beyond the insulation strip, may be slightly tapered so as to facilitate their insertion into bifurcated terminals 22, or forked terminals, of the type illustrated on an enlarged scale in Figs. 4 through 9, which will be described more fully later. These bifurcated elements are mounted on an insulation strip 23, similar to the strips 10–13, and strip 23 is attached, or riveted, at 24 to an opening in a panel plate 25, or any plate that may be a part of some additional larger electronic assembly. Terminals 22 are connected to an outgoing cable 26 which connects the entire unit of Fig. 1 to some other part of the electronic system or circuit. Accordingly, the entire modular unit can be connected to other circuits by merely plugging it into a receptacle composed of strip 23, terminals 22 and cable 26. The taper on the riser wires may be eliminated in which case the wires terminate in straight ends such as 1416, illustrated in Fig. 14.

In the electronic assembly illustrated in Fig. 1, the electronic components, such as 27, 28, 29, 41 etc. are placed, as a rule, in the planes parallel to the planes of the strips 10, 11, 12 and 13, but it is also possible to position some of the components between the strips, in the manner of the components 29, 41 and 42.

If the modular unit calls for vacuum tubes and tube sockets, they may be mounted in two different ways. One type of mounting is illustrated in Fig. 1, and the other in Fig. 14. In Fig. 1 the sockets are mounted on insulation posts 44, or hollow cylinders 44, which are fastened to the upper strip 10 by means of bolts 49 (hardly visible) which fasten the tube sockets 45 to the upper strip 10. The tube sockets may be provided with conventional shields 46 and socket saddles 47 which may be used for flush deck mounting of the entire modular assembly in demountable cases of the type disclosed in my copending application entitled "Encased Electronic Modular Units," and having Serial No. 471,296, filed Nov. 26, 1954. In this case the tube sockets are mounted in a plane parallel to the plane of the upper strip 10.

Figure 2 illustrates, on an enlarged scale, the type of connection formed between the riser wire 15 and strips 12, 13 and 23. A zip terminal 39 is shown on an enlarged scale in Fig. 2. This terminal is fastened to strip 12 by means of an eyelet 61. Wire 15 is soldered to the eyelet at 60 when the entire assembly is dip-soldered. The same riser-wire is dip-soldered at 65 to strip 13 through an eyelet 64.

Figure 4:
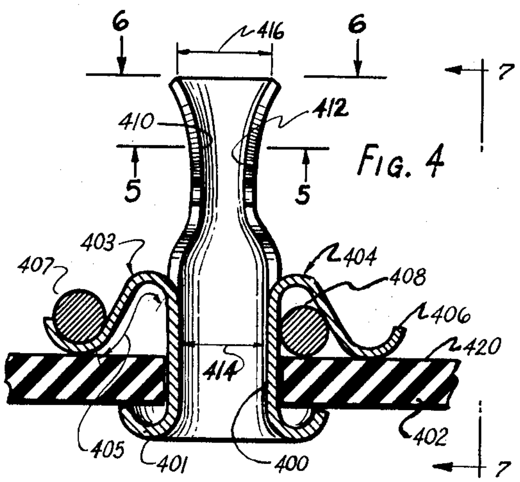
Figures 4, 8 and 9 are vertical sectional views of three types of forklet terminals.

The connection between the tapered end 21 of wire 15 and cable 26 is through the plug-in bifurcated terminal 22 which is also illustrated in Figs. 4, 5, 6 and 7. The terminal comprises a tubular member 400, Fig. 4, provided with an expanded eyelet 401 which attaches the terminal to one side of an insulation strip 402. The opposite end of the tubular member comprises two spring tongues 403 and 404 which includes arch portions 405 and hook portions 406, the arch and the hook portions combining to produce a spring member approximating a capital S letter. The hook portion 406 of the S member is used for connecting any lead-wires, such as wire 407, to the terminal, and the arch portion 405 is also used for the same purpose, as illustrated by wire 408.

Figure 6:
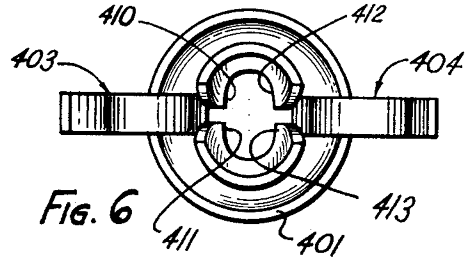

The S-shaped spring tongues 403 and 404 are two rectangular strips of metal, as illustrated in Fig. 6, which are sheared off, or struck out, from the upper portion of the tubular member 400 by a special tool having two shearing portions for shearing the two tongues 403 and 404 simultaneously by the downward stroke of the tool on the tubular member 400. The tongues 403 and 404 are struck out first, and the next step in making the terminal is to introduce a side-flare 700 and detents 701 and 702 in the two upright terminal members 703 and 704 which is accomplished by inserting another tool into the tubular portion of the terminal and exerting a centrally directed pressure on the two sides 703 and 704 of the terminal. The roundly shaped upright members 703 and 704 are then each reshaped, or squeezed, so that the edges 410 and 412 are brought closer together so that the distance 500, Fig. 5, between the edges is made smaller than the original inner diameter 414 of the tubular member 400. The outer end 416 of the terminal is expanded and reshaped into a funnel-shaped end so as to act as a guiding surface for any pin-type terminal that may be inserted into the terminal from the upper end 416 of the terminal.

From the description of the bifurcated terminal illustrated in Figs. 4 to 7, it follows that it can be used for making connections with pin-type terminals, or prongs, which can be inserted into the terminal from either side of the terminal. This connection can be made either of sliding type or of permanent type by dip soldering the terminal. The inserted pin makes four positive connections with four constricted surfaces 410, 411, 412 and 413 of the terminal through the entire lengths of these constricted surfaces. In addition to the above connection, the terminal is also provided with two terminal members for receiving four wires such as wires 407 and 408, these two terminal members being formed by the S-shaped side spring-members 403 and 404. These same spring members hold the entire terminal fastened to the insulation strip 402. The disclosed terminal, therefore, can be attached very readily to flat panels, such as strip 402, the S-shaped members making an elastic engagement with the insulation strip 402. Therefore, cracking of insulation is not encountered with the terminal of this type, which is often the case when the terminals are not provided with the spring-type connecting means.

Figure 7:
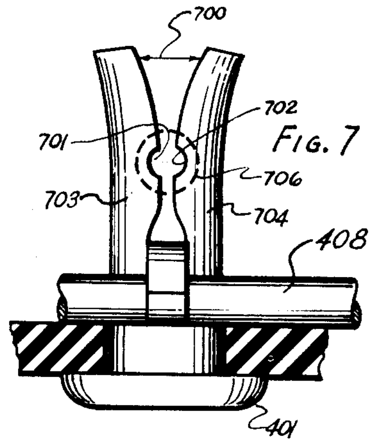
Figure 7 is a side view of the terminal illustrated in Fig. 4.
Figure 5:
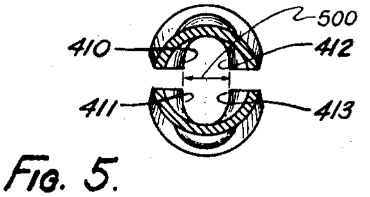
Figures 5 and 6 are top plan views of the forklet terminal illustrated in Figures 4 and 7, respectively.

The terminal illustrated in Figs. 4 through 9 can be used also for receiving wire leads in a plane of the S-shaped members and the plane of the slots shown in Fig. 7. Such wire connection is illustrated in dotted lines in Fig. 7 by a wire lead 706. In this case the two side-posts 703 and 704 act as spring jaws holding wire 706 in tight engagement with the terminal.

Figure 8:
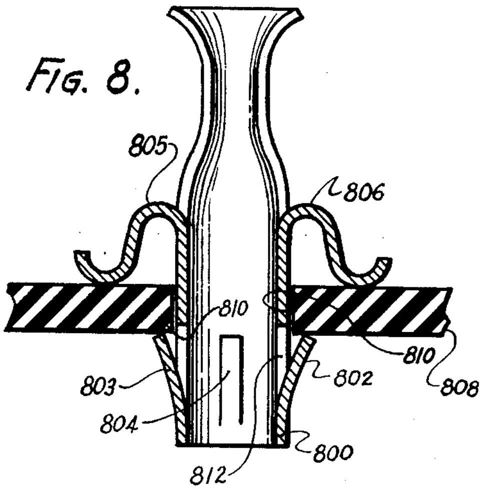

Fig. 8 discloses an additional version of the forked terminal. In this version, the tubular member 800 is provided with spring strips 802, 803 and 804 distributed around the circumference of a hollow cylinder, or tube, 800. This type of forked terminal has the advantage over the terminal illustrated in Figs. 4 to 7 in that it can be made or completed as a self-fastening terminal at the time the other parts of the terminal, such as the spring members 805 and 806, are being formed. The terminal then is fastened to the insulation strip 808 by merely pushing it down through an opening 810 in strip 808. The spring members are sufficiently flexible to slide into the slots 810 and 812 when the spring members are pushed through hole 810 in the strip. After passing through the hole, the spring strips snap outwardly and assume the positions illustrated in Fig. 8, thus fastening the terminal to the strip. The position of the strips is such as to tension the spring members 805 and 806 sufficiently to hold the terminal in a sufficiently rigid position with respect to the strip 808. To accomplish this, the spacing between the upper ends of the strips 802, 803, 804 and the bottom portions of the spring members 805 and 806 should be less than the thickness of strip 808 when springs 805 and 806 are in their normal, non-tensioned positions. Since springs 805 and 806 can stand fairly large deformations without exceeding their elastic limits, this terminal is capable of being fitted into a number of strips having different thicknesses.

Figure 9:
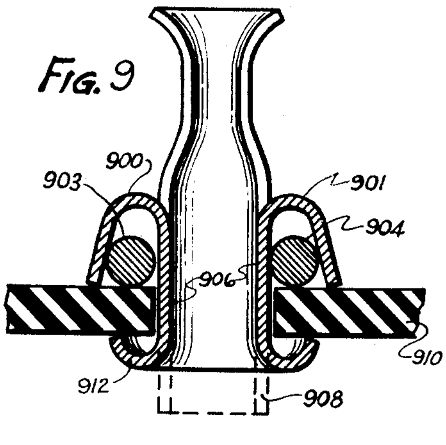

Fig. 9 illustrates still another version of the terminal. In this version the spring members 900 and 901 are shaped as two arc members 900 and 901 which are spaced and proportioned so as to be sufficiently large to receive wires 903 and 904. These two members, like members 403 and 404, are sheared off the tubular member 906, except that the tool for shearing these members off the tubular member is shaped differently so that the final shape of the spring members is of the type illustrated in Fig. 9.

The lower portion 908 of the terminal, illustrated in dotted line, may be furnished as a straight tubular member 908 which may be inserted into an opening in a strip 910 and then expanded to provide a flange 912 thereafter. Accordingly, in this case, the terminal is fastened to the insulating strip by expanding the tubular end 908, while in Figs. 4 to 7 this is accomplished by striking out tongues 403 and 404 and pressing them against the upper surface 420 of the insulating strip. In this case (Figs. 4–7) the terminal eyelet 401 is made prior to the striking out of the terminal 403 and 404.

In concluding the description of the terminals illustrated in Figs. 4 to 9, it follows that these terminals are adapted to receive conductors in three different planes, or along three axes, such as X, Y and Z axes. The Y-axis may correspond to the longitudinal axis of the terminal, the X-axis corresponds to the axis of conductor 706 in Fig. 7, and the Z-axis corresponds to the axis of the conductors 407 and 408. These connections can be either soldered connections or merely pressure-formed contacts. The same three dimensional relationship of conductors is true for the terminals shown in Figs. 8 and 9.

Figure 11:
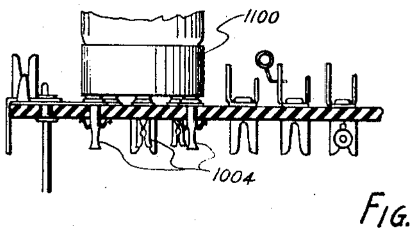

The advantages in terms of saving space and wiring conveniences, as well as the overall reduction in cost of construction of the modular units when the forklet terminals illustrated in Figs. 4 to 9 are used, are illustrated in Figs. 10 and 11. Figure 10 is a plan view of an insulating strip 1000, which corresponds to strip 10 in Fig. 1. The strip is provided with seven terminals 1004 which may be of the type illustrated in Figs. 4 to 9. As viewed in Fig. 10, only the eyelet portions 1004 are visible in this figure. The eyelets are connected by means of metallic straps of ribbon tape, such as 1005, 1006, or wires 1007, 1008, to the zip terminals 1009 illustrated in a perspective view in Figs. 12 and 13. The bifurcated terminals 1004 are disposed so as to receive the tube prongs in the manner illustrated in Fig. 11 where tube 1100 is plugged directly into the bifurcated terminals 1004. Examination of Figures 10 and 11 discloses the fact that the combination of the insulation strip 1000 and terminals 1004 results in a very compact tube receptacle eliminating altogether a bulky structure of tube sockets 45, posts 44 and bolts 49 which are necessary for mounting tubes in the modular unit illustrated in Fig. 1. Accordingly, the modular unit of Fig. 1, when built in accordance with what is disclosed in Figs. 10 and 11, would look like the unit illustrated in Fig. 1, but with the entire tube socket structure 44, 45 and 49 completely removed and replaced with the forklet terminals. Three advantages accrue as the result of such replacement: firstly, a marked reduction in cost; secondly, a marked reduction in space required for mounting the tubes; and, thirdly, simplification in wiring because the forklet terminals are easier to wire than the socket terminals 50, Fig. 1, which are far removed from the upper surface of the insulating strip 10 and, therefore, the connecting wires cannot be mounted in the planes parallel to the plane defined by strip 10. In the case of the bifurcated terminals, the terminal tongues 403 and 404 are resting directly on the surface of the insulation strips and, therefore, all wire connections can lie directly on the surface of the insulation strip.

Figure 12:
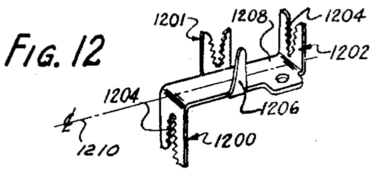
Figures 12 and 13 are perspective views of two types of "zip" terminals especially suitable for use in connection with the disclosed modular units.
Figure 13:
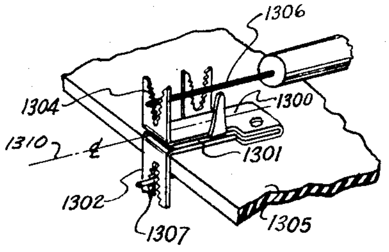

The "zip" terminal 39 illustrated in Figs. 1 and 2 is illustrated in perspective views in Figs. 12 and 13. Figure 12 illustrates the terminal having three zip extensions, or lugs, 1200, 1201 and 1202 the bifurcated ends of which are provided with a serrated edge 1204 either on one side or both sides of the bifurcated opening for speeding up and simplifying component mounting, the serrated edges of the wire-gripping jaws 1200, 1201, and 1202 holding the wires securely within the jaws until they are soldered to them. The terminal is also provided with a cross-strap member 1206 which can be bent over to obtain cross-strapping of the terminals in the manner illustrated in Fig. 1 at 54. The terminal is fastened to the insulation strips by means of eyelets passing through an orifice 1208 provided in the flat portion of the terminal. This connection is illustrated at 60, 61, 62 and 63 in Fig. 2. As also illustrated in Fig. 2, the opening through the eyelet can be used for mounting wires, such as riser wires 15 and 66. The bifurcated lugs 1200, 1201 and 1202 constitute integral parts of a base plate 1212 provided with the orifice 1208 for fastening the terminal to the insulation strip by means of an eyelet in the manner shown in Figs. 1, 2, 10 and 14.

The terminal illustrated in Fig. 13 differs from that shown in Fig. 12 in that the flat base portion, or the ribbon portion 1300—1301 of the terminal is bent over upon itself to form two super-imposed, bent upon each other flat plate base portions, or members, 1300 and 1301 which enables one to provide two bifurcated zip terminals 1302 and 1304 at the edge of an insulation strip 1305, one terminal being bent down and the other up to provide the zip terminals for the upper and lower surfaces of the insulation strip 1305 so that the electronic components can be connected in the manner idicated at 1306 and 1307. The remaining portions of this terminal are identical to that shown in Fig. 12 and, therefore, need no additional description.

The terminals disclosed in Figs. 12 and 13 constitute modifications of the terminals disclosed in my co-pending application entitled "Terminal Lug," Serial No. 453,982, filed on September 3, 1954, now Patent #2,762,030.

Figure 14:
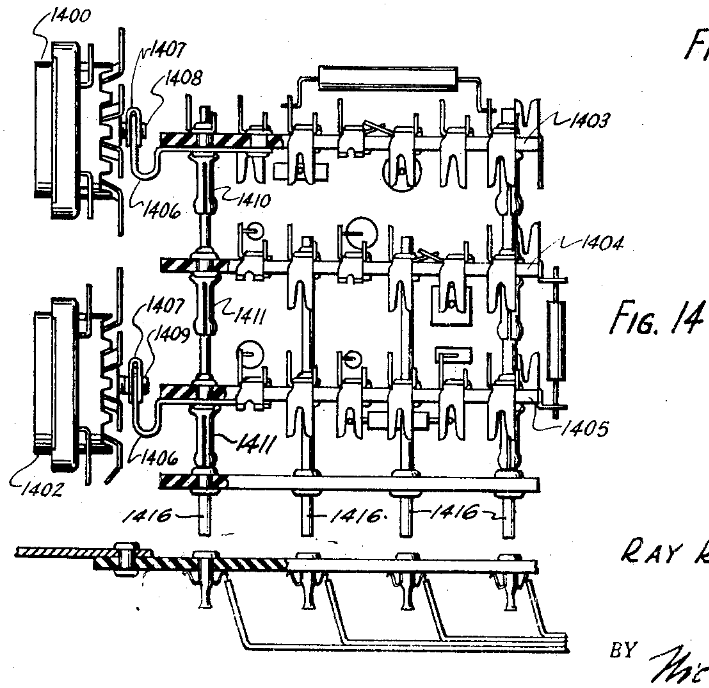
Figure 14 is a side-view of a modular unit in which conventional tube sockets are mounted in a plane perpendicular to the planes of insulation strips.

Fig. 14 differs from Fig. 1 only in one respect: the tube sockets 1400, 1402 are mounted in a plane perpendicular to the planes of the insulation strips 1403, 1404, and 1405. This is accomplished by means of mounting brackets 1406 provided with a U-shaped cleat 1407 for engaging the thread of bolts 1408 and 1409. The other end of the brackets 1406 is fastened to the strips 1403 and 1405 by means of clips 1410 and 1411 which are of the type shown in Fig. 3.

The tube sockets in Fig. 14 can be eliminated by using the type of mounting illustrated in Fig. 10 in which case strip 1000 is mounted on the brackets 1406.

Figure 15:
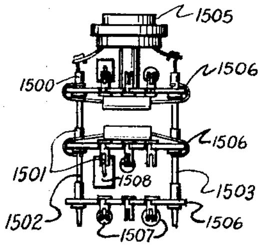
Figures 15 and 16 are side and plan views, respectively, of a modular unit especially suitable for miniature units having small dimensions.

Fig. 15 illustrates a modular unit similar to that illustrated in Fig. 1 but provided with the terminals of the type illustrated in Figs. 7, 8, or 9 for mounting the riser wires and the components. It is especially suited for small units where space is at a premium. The terminals 1500 and 1501 may be arranged so as to project upwardly or downwardly from the strips. (In Fig. 15, they project upwardly.) The riser wires 1502 and 1503 are held rigidly and are soldered to the terminals. The tube socket 1505 may be mounted in the same manner as the tube sockets in Fig. 1 or it may be replaced with the type of socket illustrated in Figs. 10 and 11. The electronic components are mounted in this case primarily in the planes of the strips 1506, as illustrated at 1507 and 1508.

Figure 16:
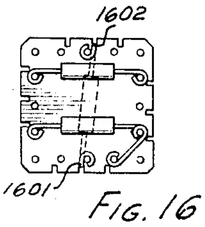

Fig. 16 illustrates the positions of the components on the strips in a plan view and their connections to the terminals. In order to avoid interference between the riser wires, such as 1502 and 1503, and the lead wires of the components, such as 1507, the lead-wires are wrapped around the terminals 1500 and 1501 in the manner indicated in Fig. 16. The insulation strips are provided with notches 1510 for positioning the lead-wires on the strips in the manner indicated at 1601 and 1602 in Fig. 16.

The same offset method of mounting components is used as in Figs. 1, 10, and 14, namely, that the lead-wires of the components are placed so as not to interfere with the positioning of the riser wires in the eyelets 61 and 64, Fig. 2. This is accomplished by making the orifices, such as 1208, offset to one side from the longitudinal axis 1210 and 1310 of the terminal, as illustrated in Figs. 12 and 13.

Some of the riser wires, such as 14 in Fig. 1, pass through all the strips, while others such as 18, are connected only to strip 12, the length of any given riser wire depending upon the type of connection which may be assigned to the wire. Moreover, the riser wires, such as 18, may have their upper end shaped as a wedge for wedging the wire in an eyelet thus holding them in fixed position until they are soldered. The wedge-shaped ends are used on those riser wires which are not held in fixed position with respect to the strips by the clip terminals 32 which are illustrated more in detail in Fig. 3.

I claim:

1. An electrical modular assembly comprising a plurality of rectangular insulation strips, each strip having four edges and four corners, a row of uniformly spaced orifices along at least two edges of each strip, said row of orifices being offset from the respective edge of the strip, a plurality of terminals having a plurality of bifurcated lugs and a cross-strap tongue projecting from a flat base portion of the terminal, said base portion having an orifice, an eyelet passing through some of the orifices of some of the terminals for fastening said last-recited terminals to the respective strips, the terminal orifices matching the respective strip orifices, each of said terminals, its lugs and the eyelet providing means for mounting electrical components along three mutually perpendicular *x*, *y* and *z* axes; a riser wire clip having two jaws, said clip being mounted at each corner of the insulation strip, and a riser wire passing through each clip, the jaws of said clip gripping said wire but permitting a forced sliding of said riser wire through said clip for positioning said strips, on said riser wire, in a desired transverse plane prior to dip-soldering of said assembly.

2. An electrical modular assembly as defined in claim 1 in which each of said terminal members includes a first forked lug lying in a first plane perpendicular to the surface of said strip for receiving conductors perpendicular to said first plane, a second forked lug lying in a second plane perpendicular to the first plane and tangential to adjacent edge of said strip for receiving conductors perpendicular to said second plane, and a third eyelet terminal concentric with the orifice of said terminal for receiving conductors perpendicular to the plane of said strip, whereby said assembly provides means for mounting said electrical components along said three mutually perpendicular *x*, *y* and *z* axes.

3. An electrical modular assembly comprising a plurality of rectangular insulation strips having four edges and four corners, a row of uniformly spaced orifices along at least two edges of each strip, each row of said orifices being offset inwardly from the respective edge of the strip, each row including a corner orifice at each corner of said strip, a plurality of terminal members, each having an orifice and an eyelet for fastening said terminal member to its strip through the respective orifice in said strip, said terminal member having at least two bifurcated terminal lugs lying in two mutually perpendicular planes, a tubular riser wire clip passing through each corner orifice, and a plurality of riser wires each passing through at least two aligned clips mounted on two adjacent strips, for integrating all of said strips into a unitary structure, with said strips lying in the respective planes parallel to each other, said riser wire clip having jaw means for rigidly holding its riser wire but permitting forced sliding of said riser wire through its clip for positioning said strip in a desired transverse plane.

4. An electrical modular assembly as defined in claim 3 in which at least some of said riser wires pass through the strips and extend beyond one outer strip to form plug-in prongs for said assembly.

5. An electrical modular assembly as defined in claim 3 in which said tubular riser wire clip comprises a metallic tube passing through an orifice in said strip, one end of said tube being expanded into an eyelet engaging one surface of said strip, an expanded portion engaging the opposite surface of said strip, and a tubular portion extending beyond said expanded portion and beyond said opposite surface and terminating in said spring-shaped jaws for positive gripping of the riser wire passing through said clip.

6. An electrical modular assembly as defined in claim 3 in which said tubular riser clip comprises a metallic tube passing through an orifice in said strip, the portion of said tube adjacent to said strip having a flange on one side of said strip and an expanded part on the other side of said strip for attaching said tube to said strip without closing said orifice, the other end of said tube terminating in said two jaws for yieldingly gripping any member passing through said tube.

7. An electrical modular unit comprising an insulation strip, a plurality of orifices punched in said strip, and forked terminals mounted in said orifices, said forked terminals having flanged ends at one end for engaging one surface of said strip, spring tongues at the other end of said terminals for engaging the other, or the opposite, surface of said strip, and two crimped grip-jaws beyond said tongues, said forked terminals being adapted to receive tube prongs for plugging said tube directly into said terminals, and for mounting said tube directly on said strip without the use of conventional tube sockets.

8. A forked terminal mountable on an insulation base comprising a tubular member having a hollow cylindrical end portion, said end portion terminating in and having expanded flange for abutting against an adjacent first surface of said base, a forked portion extending beyond the opposite, second surface of said base, said forked portion also having two lateral terminal tongues normally engaging the second surface of said base, opposite to said first surface, said tongues being the integral parts of said terminal and each having a configuration for receiving at least one lead-wire for electrically connecting said terminal to said lead-wire, said forked portion extending outwardly beyond said tongues and comprising two opposed members spaced from each other at their base by said tongues, said opposed members being shaped into two grip-jaws to receive a plug-in prong or a lead-wire placed transversely and between said opposed members.

9. A forked terminal as defined in claim 8 in which said expanded means is an eyelet.

10. A forked terminal as defined in claim 8 in which said expanded means comprises a plurality of spring tongues cut out and projecting outwardly from said hollow cylindrical end.

11. An electronic modular assembly comprising a plurality of insulation strips, each strip having a plurality of punched out orifices located within said strip, a plurality of terminals mounted on said strips, each terminal comprising a base plate having a bifurcated lug at two opposite ends of said plate, the two end-lugs constituting two bent-over ends of said plate, a third bifurcated lug constituting a bent-over extension of one side of said plate, a cross-strap finger constituting a bent-over extension of the opposite, or the other, side of said plate, a side-lug constituting a lateral, or side, extension of said plate, said side lug having a lug orifice, an eyelet passing through the lug orifice and the corresponding, aligned strip orifice; said eyelet fastening said terminal to its insulation strip, and riser wires passing through some of the eyelets, said wires integrating said assembly into a single rigid unit.

12. The electronic assembly as defined in claim 11 which also includes a plurality of female receptacles passing through some of the orifices of the outer strip and fastened directly to said outer strip, said female receptacles having means for receiving male prongs of electronic tubes or transistor for direct mounting of said tubes and transistors on said outer strip.

13. An electrical modular assembly comprising a plurality of insulation strips having identical dimensions, a plurality of metallic terminals mounted along the edges of said strips, each terminal having a plurality of bifurcated members lying in mutually perpendicular planes for mounting electronic components in a corresponding plurality of planes, riser wires and clip-type terminals for integrating said strips into a unitary structure and for making electrical connections, said clip-type terminals having means for gripping said riser wires, said means permitting a sliding adjustment of said strips along said riser wires, one end of said riser wires forming plug-in prongs, with the strips lying in spaced, parallel planes and having a common transverse axis, electrical components connected to some of said terminals, and female receptacle means for plugging in tube prongs into said female receptacle means, said receptacle means being mounted directly on and fastened to one of the outer insulation strips, said receptacle means having first means abutting against one, or the outer, surface of said outer strip, and second means abutting against the opposite, or the inner, surface of said strip to resist push and pull forces exerted on said female receptacle means by the tube prongs during the insertion and removal of said tube into and from said receptacle means.

14. An electrical modular assembly as defined in claim 13 in which said receptacle means comprise a plurality of forked terminals, said forked terminal including a flanged head at one end, and a forked portion at the other end, and metallic straps under respective flanged heads for electrically connecting said forked terminals and said flanged heads to the respective terminals along the edge of said supporting strip.

15. An electrical modular unit comprising an insulation strip, a plurality of orifices punched in said strip along the edges of said strip but in inwardly spaced relationship with respect to said edges, said strip also including orifices arranged in a circle, and forked terminals mounted in said last orifices, said forked terminals comprising metallic, reshaped tubes having flanged ends on one side for fastening said terminals to one surface of the strip, spring tongues on the other side for fastening said terminals to the other surface of the strip, and two crimped grip-jaws beyond said tongues forming a female receptacle of said terminal, said crimped grip-jaws extending through that part of the tube which projects beyond said other surface of said strip, said circularly arranged terminals, by means of said female receptacle portion of the terminal, being adapted to receive tube prongs for plugging said tube directly into said terminals, whereby said forked terminals and said strip act as a tube socket for said tube.

16. An electrical modular assembly comprising a plurality of insulation strips having a plurality of perforations and means for integrating said strips into a single rigid unit with said strips lying in respective parallel planes, said means including a plurality of riser wires and clip-type terminals slidingly fastened to said wires and riveted to said strips, at least some of said riser wires being positioned along the peripheries of at least some of said strips, a plurality of metallic terminal members mounted along the edges of at least some of said strips, each terminal having an orifice and an eyelet for mechanically connecting said terminal to said strip through a corresponding perforation in said strip with a portion of said perforation remaining open, each terminal also having at least one forked terminal lying in a plane perpendicular to said parallel planes, electrical components connected at least to some of said terminals, and at least one tube socket mounted on one of the outer strips for mounting a thermionic tube, said tube socket consisting of only female terminals mounted directly on said outer strip, said female terminals passing through the properly arranged, or grouped, perforations in the outer strip and having two crimped grip-jaws projecting beyond adjacent surface of the strip.

17. A modular assembly comprising a plurality of parallel insulation strips having at least one row of orifices, a plurality of terminals, each terminal having a plurality of bifurcated lugs with serrated edges and cross-strap tongues, said lugs lying in a corresponding plurality of mutually perpendicular planes, said terminals being mounted along at least some edges of said strips, each terminal having a base plate and an orifice in said plate, an eyelet fastening each of said terminals to its respective strip, said eyelet passing through the aligned orifices in said plate and said strip, said plate orifice being offset from the axes defining the positions of conductors in said bifurcated lugs, at least one tube socket receptacle attached to said unit and connected to some of said terminals, some adjacent bifurcated terminals being connected to each other by means of bent over cross-strap tongue and adjacent bifurcated lug, connectors cross-strapping some of the nonadjacent terminals on the same strip, and riser wires interconnecting said strips into a single unit, said riser wires passing through the respective orifices in said strips, the orifices in said terminal plates and the eyelets, some of said riser wires extending beyond one of the outer strips to provide plug-in prongs for said assembly, the terminals through which the riser wires pass being used, in part, for connecting the corresponding riser wires to the circuits of said assembly.

References Cited in the file of this patent

UNITED STATES PATENTS

| | | |
|---|---|---|
| 2,405,554 | Barbour | Aug. 13, 1946 |
| 2,446,701 | Greene | Aug. 10, 1948 |
| 2,579,141 | Eckert | Dec. 18, 1951 |
| 2,593,479 | Nieter | Apr. 22, 1952 |
| 2,613,252 | Heibel | Oct. 7, 1952 |
| 2,628,270 | Himmel | Feb. 10, 1953 |
| 2,640,185 | Alden | May 26, 1953 |
| 2,754,454 | McNutt | July 10, 1956 |
| 2,762,030 | Scoville | Sept. 4, 1956 |
| 2,774,014 | Henry | Dec. 11, 1956 |

FOREIGN PATENTS

| | | |
|---|---|---|
| 592,686 | Great Britain | Sept. 25, 1947 |

OTHER REFERENCES

Lawson, A. A.: Electrical Mfg., October 1954, page 135.